United States Patent [19]
Sessler et al.

[11] 3,736,552
[45] May 29, 1973

[54] ACOUSTIC IMAGING DEVICE USING MULTIPLE ELEMENT ELECTRET TRANSDUCER

[75] Inventors: Gerhard Martin Sessler, Summit, N.J.; Kenneth James Taylor, Doubleview, Australia

[73] Assignee: Bell Telephone Laboratories, Incorporated, Murray Hill, N.J.

[22] Filed: July 27, 1971

[21] Appl. No.: 166,366

[52] U.S. Cl..........340/5 MP, 73/67.5 H, 179/111 E, 340/5 H, 340/14
[51] Int. Cl. .................................................G01s 9/66
[58] Field of Search ...................179/111 E; 73/67.5 H; 340/5 H, 5 MP, 13 R, 14

[56] References Cited
UNITED STATES PATENTS 3,030,540 4/1962 Mash ...........................340/5 MP
3,118,022 1/1964 Sessler et al. .................179/111 E
3,475,551 10/1969 Green et al. .................340/5 MP
3,593,254 7/1971 Glen, Jr. et al. ................340/5 H
2,528,730 11/1950 Rines..............................340/5 MP Primary Examiner—Richard A. Farley
Attorney—William L. Keefauver

[57] ABSTRACT

In an acoustic imaging system, the shape of an object may be reconstructed by directing sound energy on the object and sensing the sound field scattered by it. An improved sensing unit, which exhibits high resolution, large aperture and good sensitivity and which is sufficiently robust to be used as a field instrument, utilizes a large area, divided-backplate foil electret transducer. Each backplate unit, with its share of the overlying foil electret, constitutes an individual transducer element. The resulting array is capable of real time operation, responds to relatively small acoustic energy densities, and is suitable for operation in either a gaseous or liquid medium.

13 Claims, 6 Drawing Figures

PATENTED MAY 29 1973

ACOUSTIC IMAGING DEVICE USING MULTIPLE ELEMENT ELECTRET TRANSDUCER

This invention relates to electrostatic transducers, and more particularly to a foil electret transducer array suitable for use as an acoustic imaging device.

BACKGROUND OF THE INVENTION

Visualization of an object from its interaction with sound waves has recently acquired great significance in various fields of acoustical physics and engineering. The use of acoustic "cameras" is important because it facilitates the examination of structures otherwise concealed by optically opaque media. Acoustic imaging systems are potentially useful in the nondestructive testing of engineering structures, the visualization of structures located under water, and the examination of body tissue for biological and medical purposes. The broad feasibility of these applications has been amply demonstrated by a number of systems which vary mainly in the method of sensing the acoustic wave information.

FIELD OF THE INVENTION

Conventional methods of acoustic visualization of an object generally employ some form of acoustic sensor, either a single transducer scanned over the field, or a two-dimensional array of transducers. Crossed linear arrays are attractive because they require fewer elements than does a plane array with the same effective aperture. However, the data processing required to develop an acoustic image with such an array is so complex that a plane array is more appropriate for producing an image in real time. Plane arrays typically utilize a number of piezoelectric transducer elements or a single piezoelectric plate scanned with an electron beam. The latter arrangement is known as the Sokolov ultrasonic camera. Unfortunately these units are for the most part restricted to underwater use.

While each of the arrangements described above is useful in some applications for imaging an object, they are all subject to limitations which restrict their general applicability. They are either too slow to produce images in real time or too delicate and complex to be used except in a laboratory environment. Ideally, a transducer system should provide a direct readout of an image in real time and yet be sufficiently rugged for use as a field instrument. Moreover, the system should not be restricted to use in a liquid medium.

Thus, there exists a continuing need for an acoustic imaging device that is mechanically rugged and yet capable of producing images in real time without the abovementioned disadvantages.

SUMMARY OF THE INVENTION

It is, therefore, an object of this invention to create a graphic reconstruction of an object by means of an improved sensing unit which exhibits high resolution, large aperture, good sensitivity, and which is sufficiently robust to be used as a field instrument. It is another object of the invention to utilize a large area electrostatic transducer array as an acoustic imaging sensor.

To achieve these goals, it is in accordance with the invention to employ a foil electret transducer array which utilizes a large electret diaphragm and a multiply divided backplate. The backplate is equipped with a plurality of individually conductive elements, each connected to an external circuit. A single sheet of foil electret material is held in intimate contact with the backplate and all of its conductive elements. As is well known to those skilled in the art, a foil electret includes a self-charged dielectric layer with a conductive coating over one of its surfaces. Each element of the backplate and the portion of foil electret coextensive with it constitutes an individual acoustic transducer element. An electret transducer of this sort exhibits high sensitivity and is capable of operating without an external bias supply. Even though a plurality of individual transducer elements are formed with a single sheet of electret material, each transducer element functions essentially independently from all others. Thus, there is virtually no lateral coupling. Moreover, using programmed machining or integrated circuit techniques, high resolution can be achieved by forming a large number of individual transducer elements, with linear dimensions of about a wavelength, in a small area.

BRIEF DESCRIPTION OF THE DRAWINGS

The construction and operation of a multiple element electrostatic transducer in accordance with the invention and its operation in an acoustic imaging system will be better understood from the following description with reference to the attached drawings.

In the drawings.

DETAILED DESCRIPTION

Figure 1:
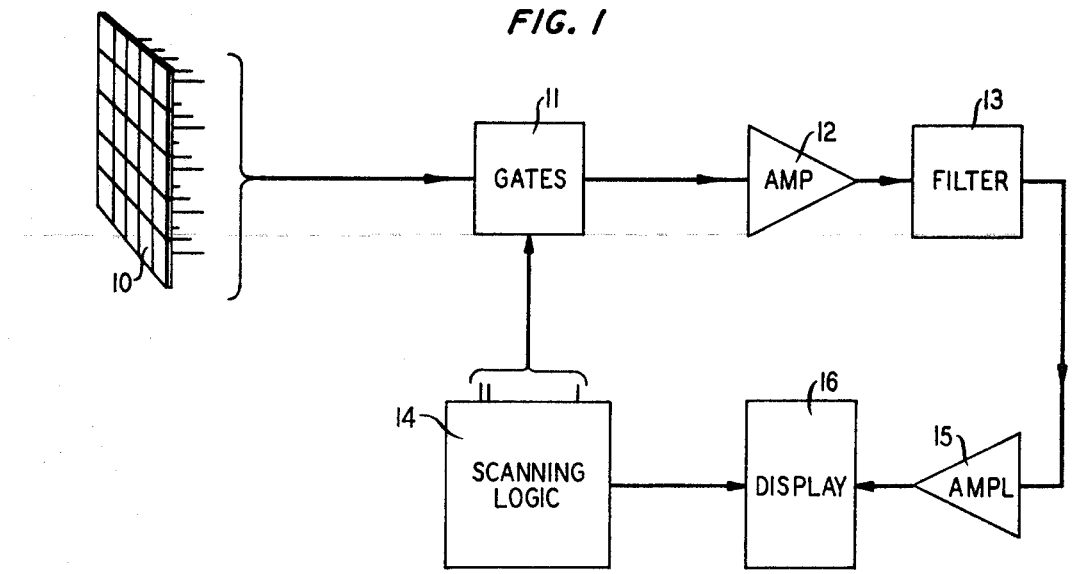
FIG. 1 is a block schematic representation of an acoustic imaging system which illustrates one application of the transducer of the invention.

An acoustic imaging system is illustrated schematically in FIG. 1. Such systems generally employ an array of acoustic transducers 10 which receive acoustic energy reflected from or passed through an object. The object is illuminated by ultrasonic energy from any conventional source, not shown, typically at a frequency of from a few kHz to a few mHz. Electric signals developed by each individual transducer of the array are read out, either sequentially or in parallel, for processing. In the typical system illustrated in FIG. 1, energy from transducer array 10 is sequentially delivered by way of gates 11 and amplifier 12 to filter system 13. Scanning is achieved by sequentially actuating gates 11 under control of signals from scanning logic system 14. Signal information is altered in its frequency composition in the filter system, reamplified in unit 15 and supplied to display apparatus 16. The display typically is synchronized by signals from scanning logic 14.

With a relatively large transducer array, the time required to scan the entire array may be on the order of seconds and, therefore, too long for many applications. As an alternative data from the transducer array may be read out in parallel, using a separate amplifier channel for each transducer, or the data from the array may be read out in parallel blocks with elements in each block being individually scanned. From the point of view of operation, the fully parallel system is by far the more desirable. Whatever the mode of readout, the signal information developed in the array is displayed in unit 16 to provide an image representative of the one illuminated by sound energy. Display 16 may take any desired form; it may include an array of light emitting diodes or the like, a cathode ray display, or any graphic recording system. If the final reconstruction of the image is to be in holographic form, data from transducer array 10 is presented in some form of a transparency, e.g., on a transparent target, for illumination with coherent light. One manner of achieving a holographic representation employs a cathode ray device with an alkali halide scotophor, whose optical density varies with the current in the electron beam, used in place of the usual cathode ray tube phosphor. Alternatively, the crt phosphor may be replaced by a KDP (potassium dihydrogen phosphate) crystal plate in which the electron beam causes local variations in the index of refraction. Either of these systems may be used with electret transducer array 10 directly coupled, in the case of a scanned output, or as a display for a vidicon type of camera in the case of parallel output using light emitting diodes.

To achieve high resolution and sensitivity, it is evident that the transducers of array 10 must be relatively small so that many of them may be packed into a tight array. With separately constructed units, such an array is difficult to fabricate. In accordance with this invention, however, a high density array is achieved by means of a multiple backplate system and a single vibratile diaphragm associated with it. A transducer array 10, illustrated for simplicity with a small number of elements, which illustrates the principles of the invention, is illustrated in FIG. 2.

Figure 2:
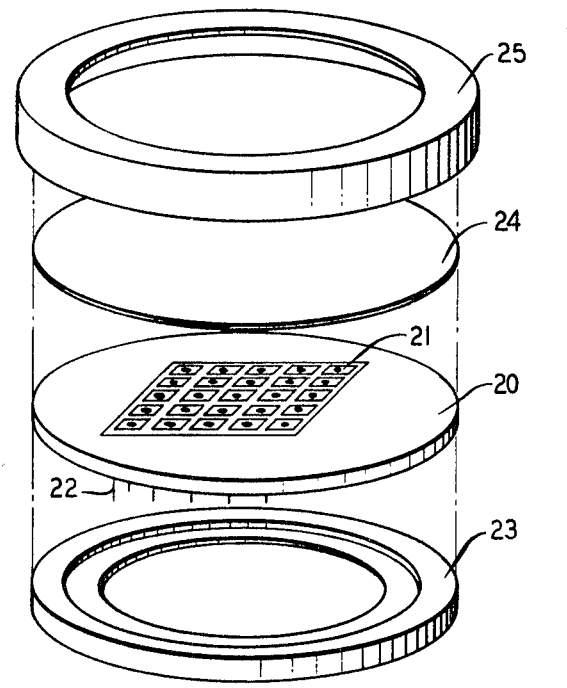
FIG. 2 is an exploded representation of a multiple backplate foil electret transducer with a small number of elements in accordance with the invention.

The transducer array shown in FIG. 2 includes a backplate member 20 which supports an array 21 of mutually separated conductive elements, i.e., a number of conductive areas isolated from one another. Array 21 may be constructed by photoetching, by using printed circuit techniques, or the like, so that each individual element includes a small area of conductive material, e.g., copper plated on an insulating base. Alternatively, a number of discrete conductive members may be assembled in an insulating support. Whatever the construction used to produce the array, it has been found advantageous to lap the surface to achieve overall surface flatness.

The exact size and shape of each conductive element, the total number of elements in the array and the overall size of the array are selected to be consistent with the wavelength of the sound source, and the desired resolution and angular field of view. In practice, a satisfactory small prototype array was constructed with an overall area of about 4 square centimeters and divided into 256 elemental conductive areas, each 2.3 mm square on 2.54 mm centers. The thickness of each conductive element depends entirely on its construction, ranging from about 50μm for photoetched or printed circuit elements, to 3 or more centimeters for a machined backplate configuration. Used as the sensor for a high resolution imaging system, the array may include about $200 \times 200 = 4 \times 10^4$ individual transducer elements, all cooperating with the single sheet diaphragm. Programmed machining techniques and printed circuit technology make miniature construction of this sort relatively simple.

An array of this kind working in air, for example, at 140 kHz, with an element size of 2.5 mm × 2.5 mm, occupies an area of $50 \times 50$ cm². Its angular resolution $\alpha$ is given by $\sin \alpha = \lambda/A = \lambda/na$ where $\lambda$ represents wavelength, A represents an edge dimension of the array, $a$ represents an edge dimension of an element and $n$ represents the square root of the number of elements in the array. In these relationships, $\lambda$, $A$, and $a$ are specified with the same units. For this case, the resolution is approximately 0.3°. The field of view of the array is given by $\sin \theta = \lambda/2d$, where $\theta$ is the half angle of the cone of view and $d$ is the element spacing. For this example, the field of view is equal to approximately 56°. Similar specifications can be achieved in water by increasing the frequency to around 600 kHz where a transducer operates quite well because of the improved impedance match between the water and diaphragm.

Any microscopic irregularities in the backplate may be compensated by deliberately spacing the diaphragm from the backplate, for example, by an average of 10μm through the use of ridges or spacers. With such a large array, the appreciable time required to scan the entire array suggests that it is preferable to read signals out in parallel from blocks of elements, by scanning within each block. This avoids some of the wiring difficulties but yet permits relatively fast readout.

An electrical connection 22 is brought out transversely through backplate 20 for each conductive element to permit each to be connected to an external circuit. Backplate 20 is supported in clamping ring 23, equipped with an aperture to permit leads 22 to be exposed for external connection.

To complete the transducer assembly, a vibratile diaphragm 24 is placed over the entire backplate array of conductive elements. In accordance with the invention, diaphragm 24 is composed of a thin layer of foil electret material. The foil electret includes a thin layer of plastic film material coated with a thin conductive layer on one surface (the upper surface in the view of FIG. 2) and charged electrostatically. Foil electrets ranging in thickness from about 6 to 50μm and charged to approximately $10^{-8}$ coulombs per square cm have been found to be satisfactory. Foil electrets charged by a scanning electron beam are preferred because of their superior uniformity of charge density and long life expectancy. Techniques for preparing foil electrets have been described recently in the art and are well known to those working with them. It is, of course, possible to utilize external biasing for the diaphragm instead of the permanent charge of an electret. For extremely large arrays, the diaphragm may be formed by bonding or otherwise holding together a number of strips of foil electret.

Electret diaphragm 24 preferably is held tightly against backplate 20 by means of clamping ring 25 appropriately formed to contain the several elements of the system and to mate with clamping ring 23. Typically, ring 25 is made of brass or another suitable conductive material. Any desired protective covering arrangement or external housing for the unit may, of course, be used as desired. For example, the foil electret may be covered for under water use by another impermeable film.

Figure 3:
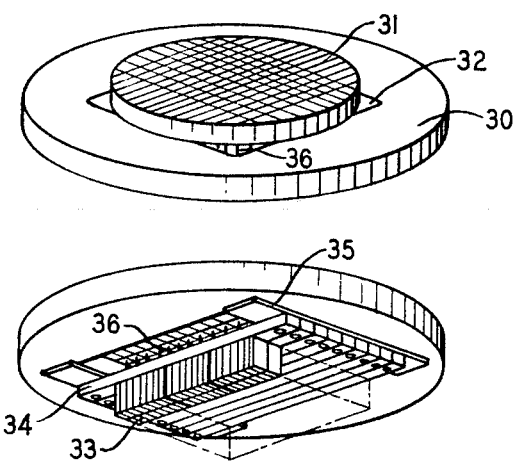
FIG. 3 is a set of perspective views, top and bottom, of a backplate arrangement in accordance with the invention.

FIG. 3 illustrates the construction of a typical transducer array using the principles illustrated schematically in FIG. 2. Support element 30 in this embodiment is employed to provide a suitable base for conductive backplate 31. Backplate 31 is machined from a single piece of metal, e.g., brass, by cutting narrow slots in one surface, for example to a depth of 3.0 mm, in orthogonal directions, to create a pattern with the desired number of array elements. The slots are filled with epoxy cement or another insulating adhesive, and the brass layer is then machined from the other side leaving a rigid assembly of brass elements joined only by the insulating adhesive and capable of being finished with a flat surface to a thickness of about 2.5 mm.

Each of the conductive elements of backplate 31 is connected, for example, by a lead 36 extending through aperture 32 in support 30 to an amplifier element 33. Each amplifier preferably is constructed using conventional integrated circuit techniques and connected directly to one of leads 36. A gating arrangement, e.g., using an insulated gate f.e.t. switch, may be associated with each amplifier if desired to facilitate selective scanning. The array of amplifier elements is packaged to provide a rigid structure and is held securely to support member 34 overlying aperture 32 and bridged between the support blocks 35. With this construction of the backplate arangement, extremely high density may be achieved for the array. As with the transducer array shown in FIG. 2 a single sheet of foil electret (not shown) is supported in close proximity to the surface of backplate 31 to complete the transducer array. If desired, light emitting diodes may be associated with each amplifier unit to provide a direct viewing screen.

Figure 4:
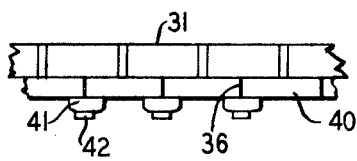
FIG. 4 is a simplified illustration of an electroacoustic transducer system with an associated display unit.

A particularly compact and efficient electrostatic transducer array with a direct viewing display, in accordance with the invention, may be fabricated using integrated circuit techniques. A typical unit prepared in this manner is illustrated in FIG. 4. The backplate configuration shown in FIG. 2, or the configuration shown in FIG. 3 with an insulating layer 40 deposited on the rear surface of backplate array 31, is used as the substrate for supporting a number of integrated circuit amplifiers 41, and coupled light emitting diodes 42, fed from each transducer unit by one of conductors 30. Conventional printed circuit connections, or the like, may be used to energize the electronic elements from any convenient source of power, not shown. With this arrangement, the rear surface of the unit, e.g., the plane defined by the outer surfaces of modules 33 in FIG. 3, constitute a viewing surface on which an image is depicted by the array of light emitting diodes. If desired, groups of individual amplifiers, light emitting dioes, gates, and the like, may be contained in large-scale integrated circuits formed on or associated with the rear surface of backplate 31.

Figure 5:
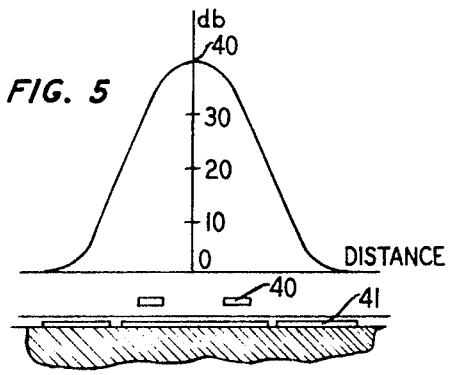
FIG. 5 is a representation which illustrates signal output from one element of a multiple element transducer array as a spot of sound is scanned across the surface of the transducer array.

FIG. 5 illustrates the isolation achieved in practice between individual elements of a transducer constructed in accordance with the invention. To derive the data, a transducer array was illuminated in air with plane sound waves at a frequency of about 150 hKz and at a level of about 95 db. A metal plate 40 with a small aperture was placed close to, but not touching, the surface of array 41 so that incident sound waves were shaded from the array except at the spot directly behind the aperture. The aperture was moved over the surface of the array. As measured with a high input impedance metering circuit, the signal from the array element directly behind the aperture was found to be at least 40 db higher than from all other elements. FIG. 5 shows relative signal levels from the central element as the aperture was scanned across the surface of the diaphragm.

Figure 6:
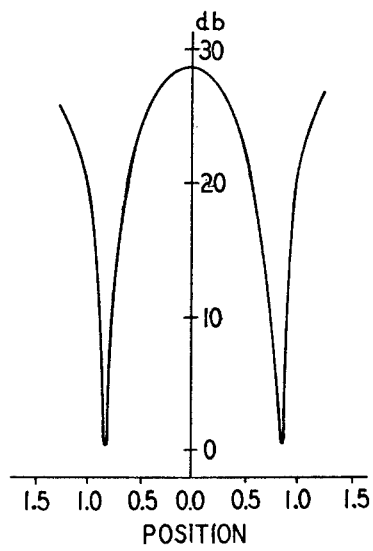
FIG. 6 illustrates the response of a transducer array constructed in accordance with the invention to an interference pattern.

Similarly, FIG. 6 illustrates the resolving sensitivity of an array constructed in accordance with the invention. The curve represents signal response of elements of the array to a point source of sound. It has been found additionally that the transducer array functions with similar characteristics in water at frequencies up to at least 500 kHz. Probably it responds well to frequencies greatly in excess of that value.

It will be recognized, of course, that some of the features of the invention may be used to advantage in fabricating a multiple element transducer that relies on external bias to energize the diaphragm as opposed to the use of an electret diaphragm.

What is claimed is:

1. An acoustic imaging sytem, which comprises:
   a multiple element electrostatic transducer for sensing a sound field, said transducer including,
   a plurality of mutually insulated conductive elements,
   a single layer foil-electret diaphragm held in intimate contact with all of said conductive elements;
   means for recovering electric signals from all of said conductive elements; and
   means for utilizing all of said electric signals to represent said sound field.

2. An acoustic imaging system as defined in claim 1, wherein,
   said means for recovering electric signals from all of said conductive elements, comprises,
   means for sequentially delivering said electric signals from all of said elements to said utilization means.

3. An acoustic imaging system as defined in claim 1, wherein,
   said means for recovering electric signals from all of said conductive elements, comprises,
   means for simultaneously delivering said electric signals to said utilization means.

4. An acoustic imaging system as defined in claim 1, wherein,
   said means for recovering electric signals from all of said conductive elements, comprises,
   simultaneously operative means for sequentially delivering said electric signals from each of a selected group of said conductive elements to said utilization means.

5. An acoustic imaging system as defined in claim 2, wherein,
   said sound field represents the shape of an object illuminated by a sound source, and wherein,
   said means for utilizing all of said electric signals to represent said sound field includes,
   means for modulating an electron beam in accordance with said sequentially delivered electric signals,
   means responsive to said modulated beam for varying the optical properties of a transparent target to form a hologram, and means for illuminating said transparent target with coherent light to produce a visual replica of said object.

6. A multiple element electroacoustic transducer for sensing sound waves scattered by an object, which comprises,
   a planar array of mutually insulated conductive elements,
   a foil-electret diaphragm commensurate in area with and held in close proximity to one plane surface of said array of conductive elements, and
   means for recovering electric signals individually from all of said conductive elements in response to an acoustic signal impinging on said diaphragm.

7. A multiple element electroacoustic transducer as defined in claim 6, wherein,
   said planar array of conductive elements comprises, an insulating base member and a plurality of discrete segments of conductive material situated thereon, and
   wherein said means for recovering electric signals from said elements comprises, an electrical connection conductively associated with each of said discrete segments of conductive material extending transversely through said base member.

8. A multiple element electroacoustic transducer as defined in claim 6, wherein,
   said planar array of conductive elements comprises, a plurality of individual conductive elements laterally bonded together with insulating adhesive and machined to create a relatively flat lateral surface including all of said elements.

9. A multiple element electroacoustic transducer as defined in claim 6, wherein,
   said foil electret diaphragm comprises a plurality of strips of foil electret material edgewise bonded together to produce a large area continuous plane sheet of said material.

10. A multiple element electroacoustic transducer as defined in claim 6, wherein,
    said means for recovering electric signals individually from all of said conductive elements in response to acoustic signal, includes,
    a thin layer of insulating material bonded as a substrate to the plane surface of said array of conductive elements opposite to said one plane surface, and
    discrete integrated circuit elements supported on said substrate and associated respectively with each of said elements.

11. A multiple element electroacoustic transducer as defined in claim 10, wherein,
    each of said discrete integrated circuit elements includes a light emitting diode.

12. A multiple element electroacoustic transducer as defined in claim 6, wherein,
    said means for recovering electric signals individually from all of said conductive elements in response to acoustic signal, includes,
    a thin layer of insulating material bonded as a substrate to the plane surface of said array of conductive elements opposite to said one plane surface, and
    large-scale integrated circuits supported on said substrate with individual circuits thereon associated respectively with each of said elements.

13. In an acoustic imaging system,
    a large area multiple element electret transducer for sensing sound waves scattered by an object, which comprises,
    a single sheet foil electret diaphragm held in close proximity to an array of mututally separate conductive elements,
    the linear dimension of each element in said array being related in size to the wavelength of said sound to achieve a desired field of view, and the number of elements in said array being related both to said element size and said wavelength of said sound to achieve a desired angular resolution,
    means for recovering signals individually from said conductive elements, and
    means for utilizing all of said recovered signals to develop an image of said object.

* * * * *